(12) United States Patent
Sampsell

(10) Patent No.: US 7,768,690 B2
(45) Date of Patent: Aug. 3, 2010

(54) BACKLIGHT DISPLAYS

(75) Inventor: Jeffrey B. Sampsell, Pueblo West, CO (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 56 days.

(21) Appl. No.: 12/146,402

(22) Filed: Jun. 25, 2008

(65) Prior Publication Data

US 2009/0323166 A1     Dec. 31, 2009

(51) Int. Cl.
*G02B 26/00* (2006.01)
*G02F 1/03* (2006.01)
*G09G 3/34* (2006.01)

(52) U.S. Cl. .............. 359/295; 359/290; 359/254; 359/224.1; 345/84; 345/108; 348/755; 216/24

(58) Field of Classification Search ......... 359/290–295, 359/298, 224, 237, 245, 246, 254; 345/84, 345/85, 102, 108, 207; 216/13, 24, 41; 385/147; 228/44.7, 120

See application file for complete search history.

(56) References Cited

U.S. PATENT DOCUMENTS

| | | | |
|---|---|---|---|
| 3,296,530 A | 1/1967 | Brooks | |
| 3,728,030 A | 4/1973 | Hawes | |
| 3,955,190 A | 5/1976 | Teraishi | |
| 4,403,248 A * | 9/1983 | Te Velde | ............ 348/755 |
| 4,441,791 A | 4/1984 | Hornbeck | |
| 4,518,959 A | 5/1985 | Ueda et al. | |
| 4,560,435 A | 12/1985 | Brown et al. | |
| 4,626,840 A | 12/1986 | Glasper et al. | |
| 4,655,554 A | 4/1987 | Armitage | |
| 4,786,128 A | 11/1988 | Birnbach | |
| 4,859,060 A | 8/1989 | Katagiri et al. | |
| 4,954,789 A | 9/1990 | Sampsell | |
| 4,956,619 A | 9/1990 | Hornbeck | |
| 4,973,131 A * | 11/1990 | Carnes | ............ 359/238 |
| 4,980,775 A | 12/1990 | Brody | |
| 4,982,184 A | 1/1991 | Kirkwood | |
| 5,022,745 A | 6/1991 | Zahowski et al. | |
| 5,028,939 A | 7/1991 | Hornbeck et al. | |
| 5,062,689 A | 11/1991 | Koehler | |

(Continued)

FOREIGN PATENT DOCUMENTS

EP     0 668 490     8/1995

(Continued)

OTHER PUBLICATIONS

Pape et al., Characteristics of the deformable mirror device for optical information processing, Optical Engineering, 22(6):676-681, Nov.-Dec. 1983.

(Continued)

*Primary Examiner*—Loha Ben
(74) *Attorney, Agent, or Firm*—Knobbe Martens Olson & Bear LLP

(57) ABSTRACT

A transmissive backlit display is disclosed. In one aspect, the backlit display comprises a backlight and an array of transmissive interferometric modulators. Each interferometric modulator comprises a fixed and moving dielectric mirror stack. The interferometric modulators cause light within the desired wavelength range to be transmitted while reflecting at least a portion of the remaining light.

26 Claims, 10 Drawing Sheets

U.S. PATENT DOCUMENTS

| | | | |
|---|---|---|---|
| 5,091,983 A | 2/1992 | Lukosz | |
| 5,096,279 A | 3/1992 | Hornbeck et al. | |
| 5,170,283 A | 12/1992 | O'Brien et al. | |
| 5,216,537 A | 6/1993 | Hornbeck | |
| 5,285,196 A | 2/1994 | Gale | |
| 5,315,370 A | 5/1994 | Bulow | |
| 5,381,232 A | 1/1995 | Van Wijk | |
| 5,452,138 A | 9/1995 | Mignardi et al. | |
| 5,471,341 A | 11/1995 | Warde et al. | |
| 5,526,172 A | 6/1996 | Kanack | |
| 5,544,268 A | 8/1996 | Bischel et al. | |
| 5,559,358 A | 9/1996 | Burns et al. | |
| 5,561,523 A | 10/1996 | Blomberg et al. | |
| 5,636,052 A | 6/1997 | Arney et al. | |
| 5,646,729 A | 7/1997 | Koskinen et al. | |
| 5,646,768 A | 7/1997 | Kaeiyama | |
| 5,661,592 A | 8/1997 | Bornstein et al. | |
| 5,665,997 A | 9/1997 | Weaver et al. | |
| 5,710,656 A | 1/1998 | Goosen | |
| 5,719,068 A | 2/1998 | Suzawa et al. | |
| 5,734,177 A | 3/1998 | Sakamoto | |
| 5,786,927 A | 7/1998 | Greywall et al. | |
| 5,808,781 A | 9/1998 | Arney et al. | |
| 5,818,095 A | 10/1998 | Sampsell | |
| 5,825,528 A | 10/1998 | Goosen | |
| 5,835,255 A | 11/1998 | Miles | |
| 5,838,484 A | 11/1998 | Goossen et al. | |
| 5,867,302 A | 2/1999 | Fleming | |
| 5,914,804 A | 6/1999 | Goossen | |
| 5,920,418 A | 7/1999 | Shiono et al. | |
| 5,961,848 A | 10/1999 | Jacquet et al. | |
| 6,028,689 A | 2/2000 | Michalicek et al. | |
| 6,040,937 A | 3/2000 | Miles | |
| 6,046,659 A | 4/2000 | Loo et al. | |
| 6,055,090 A | 4/2000 | Miles | |
| 6,100,861 A | 8/2000 | Cohen et al. | |
| 6,115,014 A | 9/2000 | Aoki et al. | |
| 6,142,358 A | 11/2000 | Cohn et al. | |
| 6,242,932 B1 | 6/2001 | Hembree | |
| 6,262,697 B1 | 7/2001 | Stephenson | |
| 6,316,289 B1 | 11/2001 | Chung | |
| 6,327,071 B1* | 12/2001 | Kimura | 359/291 |
| 6,356,254 B1* | 3/2002 | Kimura | 345/108 |
| 6,356,378 B1 | 3/2002 | Huibers | |
| 6,384,952 B1 | 5/2002 | Clark et al. | |
| 6,433,917 B1 | 8/2002 | Mei et al. | |
| 6,438,282 B1 | 8/2002 | Takeda et al. | |
| 6,452,712 B2 | 9/2002 | Atobe et al. | |
| 6,466,354 B1 | 10/2002 | Gudeman | |
| 6,556,338 B2 | 4/2003 | Han et al. | |
| 6,574,033 B1 | 6/2003 | Chui et al. | |
| 6,597,490 B2 | 7/2003 | Tayebati | |
| 6,608,268 B1 | 8/2003 | Goldsmith | |
| 6,632,698 B2 | 10/2003 | Ives | |
| 6,650,455 B2 | 11/2003 | Miles | |
| 6,657,832 B2 | 12/2003 | Williams et al. | |
| 6,661,561 B2 | 12/2003 | Fitzpatrick et al. | |
| 6,674,562 B1 | 1/2004 | Miles et al. | |
| 6,680,792 B2 | 1/2004 | Miles | |
| 6,698,295 B1 | 3/2004 | Sherrer | |
| 6,710,908 B2 | 3/2004 | Miles et al. | |
| 6,794,119 B2 | 9/2004 | Miles | |
| 6,813,059 B2 | 11/2004 | Hunter et al. | |
| 6,841,081 B2 | 1/2005 | Chang et al. | |
| 6,844,959 B2 | 1/2005 | Huibers et al. | |
| 6,867,896 B2 | 3/2005 | Miles | |
| 6,870,654 B2 | 3/2005 | Lin et al. | |
| 6,882,458 B2 | 4/2005 | Lin et al. | |
| 6,882,461 B1 | 4/2005 | Tsai et al. | |
| 6,912,022 B2 | 6/2005 | Lin et al. | |
| 6,940,630 B2 | 9/2005 | Xie | |
| 6,947,200 B2 | 9/2005 | Huibers | |
| 6,952,303 B2 | 10/2005 | Lin et al. | |
| 6,958,847 B2 | 10/2005 | Lin | |
| 6,980,350 B2 | 12/2005 | Hung et al. | |
| 6,982,820 B2 | 1/2006 | Tsai | |
| 7,006,272 B2 | 2/2006 | Tsai | |
| 7,027,204 B2 | 4/2006 | Trisnadi et al. | |
| 7,034,981 B2* | 4/2006 | Makigaki | 359/290 |
| 7,046,422 B2 | 5/2006 | Kimura et al. | |
| 7,119,945 B2 | 10/2006 | Kothari et al. | |
| 7,123,216 B1 | 10/2006 | Miles | |
| 7,126,738 B2 | 10/2006 | Miles | |
| 7,126,741 B2 | 10/2006 | Wagner et al. | |
| 7,130,104 B2 | 10/2006 | Cummings | |
| 7,161,728 B2* | 1/2007 | Sampsell et al. | 359/291 |
| 7,184,195 B2 | 2/2007 | Yang | |
| 7,184,202 B2 | 2/2007 | Miles et al. | |
| 7,196,837 B2* | 3/2007 | Sampsell et al. | 359/290 |
| 7,198,973 B2 | 4/2007 | Lin et al. | |
| 7,221,495 B2 | 5/2007 | Miles et al. | |
| 7,236,284 B2 | 6/2007 | Miles | |
| 7,245,285 B2 | 7/2007 | Yeh et al. | |
| 7,289,259 B2 | 10/2007 | Chui et al. | |
| 7,301,704 B2 | 11/2007 | Miles | |
| 7,302,157 B2 | 11/2007 | Chui | |
| 7,321,456 B2 | 1/2008 | Cummings | |
| 7,321,457 B2 | 1/2008 | Heald | |
| 7,327,510 B2 | 2/2008 | Cummings et al. | |
| 7,372,613 B2 | 5/2008 | Chui et al. | |
| 7,372,619 B2 | 5/2008 | Miles | |
| 7,385,744 B2 | 6/2008 | Kogut et al. | |
| 7,385,762 B2 | 6/2008 | Cummings | |
| 7,400,488 B2 | 7/2008 | Lynch et al. | |
| 7,420,725 B2 | 9/2008 | Kothari | |
| 7,439,943 B2 | 10/2008 | Nakanishi | |
| 7,446,927 B2* | 11/2008 | Chui | 359/290 |
| 7,564,612 B2* | 7/2009 | Chui | 359/290 |
| 7,583,350 B2 | 9/2009 | Chang et al. | |
| 7,612,933 B2 | 11/2009 | Djordjev | |
| 7,629,197 B2 | 12/2009 | Luo et al. | |
| 7,643,199 B2* | 1/2010 | Lan | 359/247 |
| 2001/0003487 A1 | 6/2001 | Miles | |
| 2001/0028503 A1 | 10/2001 | Flanders et al. | |
| 2001/0043171 A1 | 11/2001 | Van Gorkom et al. | |
| 2002/0054424 A1 | 5/2002 | Miles | |
| 2002/0070931 A1 | 6/2002 | Ishikawa | |
| 2002/0075555 A1 | 6/2002 | Miles | |
| 2002/0126364 A1 | 9/2002 | Miles | |
| 2002/0146200 A1 | 10/2002 | Kurdle et al. | |
| 2002/0149828 A1 | 10/2002 | Miles | |
| 2003/0016428 A1 | 1/2003 | Kato et al. | |
| 2003/0035196 A1 | 2/2003 | Walker | |
| 2003/0043157 A1 | 3/2003 | Miles | |
| 2003/0053078 A1 | 3/2003 | Missey et al. | |
| 2003/0202265 A1 | 10/2003 | Reboa et al. | |
| 2003/0202266 A1 | 10/2003 | Ring et al. | |
| 2004/0008396 A1 | 1/2004 | Stappaerts | |
| 2004/0008438 A1 | 1/2004 | Sato | |
| 2004/0027671 A1 | 2/2004 | Wu et al. | |
| 2004/0027701 A1 | 2/2004 | Ishikawa | |
| 2004/0043552 A1 | 3/2004 | Strumpell et al. | |
| 2004/0051929 A1 | 3/2004 | Sampsell et al. | |
| 2004/0058532 A1 | 3/2004 | Miles et al. | |
| 2004/0075967 A1 | 4/2004 | Lynch et al. | |
| 2004/0076802 A1 | 4/2004 | Tompkin et al. | |
| 2004/0080035 A1 | 4/2004 | Delapierre | |
| 2004/0100594 A1 | 5/2004 | Huibers et al. | |
| 2004/0100677 A1 | 5/2004 | Huibers et al. | |
| 2004/0125281 A1 | 7/2004 | Lin et al. | |
| 2004/0125282 A1 | 7/2004 | Lin et al. | |
| 2004/0145811 A1 | 7/2004 | Lin et al. | |
| 2004/0147198 A1 | 7/2004 | Lin et al. | |
| 2004/0175577 A1 | 9/2004 | Lin et al. | |

| | | |
|---|---|---|
| 2004/0184134 A1 | 9/2004 | Makigaki |
| 2004/0207897 A1 | 10/2004 | Lin |
| 2004/0209195 A1 | 10/2004 | Lin |
| 2004/0217919 A1 | 11/2004 | Pichi et al. |
| 2004/0218251 A1 | 11/2004 | Piehl et al. |
| 2004/0240032 A1 | 12/2004 | Miles |
| 2005/0001797 A1 | 1/2005 | Miller et al. |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0078348 A1 | 4/2005 | Lin |
| 2005/0168849 A1 | 8/2005 | Lin |
| 2005/0179378 A1 | 8/2005 | Oooka et al. |
| 2005/0195462 A1 | 9/2005 | Lin |
| 2005/0212738 A1 | 9/2005 | Gally |
| 2005/0239275 A1 | 10/2005 | Muthukumar et al. |
| 2005/0249966 A1 | 11/2005 | Tung et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0022966 A1 | 2/2006 | Mar |
| 2006/0024880 A1 | 2/2006 | Chui et al. |
| 2006/0065940 A1 | 3/2006 | Kothari |
| 2006/0066599 A1 | 3/2006 | Chui |
| 2006/0066640 A1 | 3/2006 | Kothari et al. |
| 2006/0066641 A1 | 3/2006 | Gally et al. |
| 2006/0066936 A1 | 3/2006 | Chui et al. |
| 2006/0067649 A1 | 3/2006 | Tung et al. |
| 2006/0067651 A1 | 3/2006 | Chui |
| 2006/0077152 A1 | 4/2006 | Chui et al. |
| 2006/0077155 A1 | 4/2006 | Chui et al. |
| 2006/0077156 A1 | 4/2006 | Chui et al. |
| 2006/0077533 A1 | 4/2006 | Miles et al. |
| 2006/0079048 A1 | 4/2006 | Sampsell |
| 2006/0220160 A1 | 10/2006 | Miles |
| 2006/0262380 A1 | 11/2006 | Miles |
| 2006/0268388 A1 | 11/2006 | Miles |
| 2006/0274398 A1 | 12/2006 | Chou |
| 2007/0020948 A1 | 1/2007 | Piehl et al. |
| 2007/0077525 A1 | 4/2007 | Davis et al. |
| 2007/0086078 A1 | 4/2007 | Hagood et al. |
| 2007/0121118 A1 | 5/2007 | Gally et al. |
| 2007/0138608 A1 | 6/2007 | Ikehashi |
| 2007/0177247 A1 | 8/2007 | Miles |
| 2007/0189654 A1 | 8/2007 | Lasiter |
| 2007/0194630 A1 | 8/2007 | Mignard et al. |
| 2007/0216987 A1 | 9/2007 | Hagood et al. |
| 2007/0229936 A1 | 10/2007 | Miles |
| 2007/0279729 A1 | 12/2007 | Kothari et al. |
| 2007/0285761 A1 | 12/2007 | Zhong et al. |
| 2008/0013144 A1 | 1/2008 | Chui et al. |
| 2008/0013145 A1 | 1/2008 | Chui et al. |
| 2008/0013154 A1 | 1/2008 | Chui |
| 2008/0037093 A1 | 2/2008 | Miles |
| 2008/0043315 A1 | 2/2008 | Cummings |
| 2008/0055705 A1 | 3/2008 | Kothari |
| 2008/0055706 A1 | 3/2008 | Chui et al. |
| 2008/0055707 A1 | 3/2008 | Kogut et al. |
| 2008/0080043 A1 | 4/2008 | Chui et al. |
| 2008/0088904 A1 | 4/2008 | Miles |
| 2008/0088910 A1 | 4/2008 | Miles |
| 2008/0088911 A1 | 4/2008 | Miles |
| 2008/0088912 A1 | 4/2008 | Miles |
| 2008/0094690 A1 | 4/2008 | Luo et al. |
| 2008/0106782 A1 | 5/2008 | Miles |
| 2008/0110855 A1 | 5/2008 | Cummings |
| 2008/0112035 A1 | 5/2008 | Cummings |
| 2008/0112036 A1 | 5/2008 | Cummings |
| 2008/0186581 A1 | 8/2008 | Bita et al. |
| 2008/0239455 A1 | 10/2008 | Kogut et al. |
| 2008/0247028 A1 | 10/2008 | Chui et al. |
| 2008/0278787 A1 | 11/2008 | Sasagawa |
| 2008/0278788 A1 | 11/2008 | Sasagawa |
| 2008/0316566 A1 | 12/2008 | Lan |
| 2008/0316568 A1 | 12/2008 | Griffiths et al. |
| 2009/0009845 A1 | 1/2009 | Endisch et al. |
| 2009/0068781 A1 | 3/2009 | Tung et al. |
| 2009/0073534 A1 | 3/2009 | Lee et al. |
| 2009/0073539 A1 | 3/2009 | Mignard |
| 2009/0080060 A1 | 3/2009 | Sampsell et al. |
| 2009/0103166 A1 | 4/2009 | Khazeni et al. |
| 2009/0135465 A1 | 5/2009 | Chui |
| 2009/0147343 A1 | 6/2009 | Kogut et al. |
| 2009/0201566 A1 | 8/2009 | Kothari |
| 2009/0213450 A1 | 8/2009 | Sampsell |
| 2009/0213451 A1 | 8/2009 | Tung et al. |
| 2009/0225395 A1 | 9/2009 | Ganti et al. |
| 2009/0231666 A1 | 9/2009 | Gudlavalletti et al. |
| 2009/0251761 A1 | 10/2009 | Khazeni et al. |
| 2009/0256218 A1 | 10/2009 | Mignard et al. |
| 2009/0257105 A1 | 10/2009 | Xu et al. |
| 2009/0273823 A1 | 11/2009 | Tung et al. |
| 2009/0273824 A1 | 11/2009 | Sasagawa |
| 2009/0279162 A1 | 11/2009 | Chui |
| 2010/0014148 A1 | 1/2010 | Djordjev |

FOREIGN PATENT DOCUMENTS

| | | |
|---|---|---|
| EP | 1 122 577 | 8/2001 |
| EP | 1 227 346 | 7/2002 |
| EP | 1 275 997 | 1/2003 |
| EP | 1 473 581 | 11/2004 |
| EP | 1 847 864 | 10/2007 |
| JP | 03-180890 | 8/1991 |
| JP | 04-276721 | 10/1992 |
| JP | 5-49238 | 2/1993 |
| JP | 5-281479 | 10/1993 |
| JP | 11211999 | 8/1999 |
| JP | 2002-062490 | 2/2000 |
| JP | 2001-221913 | 8/2001 |
| JP | 2002-221678 | 8/2002 |
| JP | 2003-340795 | 2/2003 |
| JP | 2004-012642 | 1/2004 |
| JP | 2004-212638 | 7/2004 |
| JP | 2004-212680 | 7/2004 |
| JP | 2005 279831 | 10/2005 |
| WO | WO 98/14804 | 4/1998 |
| WO | WO 98/59382 | 12/1998 |
| WO | WO 02/086582 | 10/2002 |
| WO | WO 2007/036422 | 4/2007 |
| WO | WO 2007/053438 | 5/2007 |
| WO | WO 2007/072998 | 6/2007 |

OTHER PUBLICATIONS

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Miles, Interferometric modulation: MOEMS as an enabling technology for high performance reflective displays, Proceedings of SPIE, vol. 4985, pp. 131-139, 2003.

Longhurst, 1963, Chapter IX: Multiple Beam Interferometry, in Geometrical and Physical Optics, pp. 153-157.

Tolansky, 1948, Chapter II: Multiple-Beam Interference, in Multiple-bean Interferometry of Surfaces and Films, Oxford at the Clarendon Press, pp. 8-11.

Conner, "Hybrid Color Display Using Optical Interference Filter Array," SID Digest, pp. 577-580 (1993).

Feenstra et al., Electrowetting displays, Liquivista BV, 16 pp., Jan. 2006.

Fork, et al., Chip on Glass Bonding Using StressedMetal™ Technology, SID 05 Digest, pp. 534-537, 2005.

Jerman et al., "A Miniature Fabry-Perot Interferometer with a Corrugated Silicon Diaphragm Support", (1988).

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.

Lezec, Submicrometer dimple array based interference color field displays and sensors, Nano Lett. 7(2):329-333, Dec. 23, 2006.

Miles, A New Reflective FPD Technology Using Interferometric Modulation, Journal of the SID, 5/4, 1997.

Taii et al., "A transparent sheet display by plastic MEMS," Journal of the SID 14(8):735-741, 2006.

ISR and WO dated Oct. 28, 2009 for PCT/US09/048323.

* cited by examiner

|  | +$V_{bias}$ | -$V_{bias}$ |
|---|---|---|
| 0 | Stable | Stable |
| +ΔV | Relax | Actuate |
| −ΔV | Actuate | Relax |

Column Output Signals / Row Output Signals

BACKLIGHT DISPLAYS

RELATED APPLICATIONS

This application is related to U.S. application Ser. No. 12/146,385, filed concurrently herewith and titled "BACKLIGHT DISPLAYS", and U.S. application Ser. No. 12/146,383, filed concurrently herewith and titled "BACKLIGHT DISPLAYS." Each of the above applications is incorporated by reference hereby in its entirety.

BACKGROUND OF THE INVENTION

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that interferometrically modulates light using the principles of optical interference. The interferometric modulator could be a reflective device that selectively absorbs and/or reflects light, or a transmissive device that selectively absorbs and/or transmits light. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN INVENTIVE ASPECTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one aspect, a transmissive display device is disclosed. The display device comprises an array of interferometric modulators deposited on the back side of a substrate, a back plate sealed to the back side of the substrate, and a reflective black mask located between the front side of the back plate and the substrate and patterned to cover at least the non-active areas of the array of interferometric modulators.

In another aspect, a transmissive display device is disclosed. The display device comprises an array of interferometric modulators deposited on the back side of a substrate, and a collimated light source located on the back side of the substrate and configured to illuminate through the array.

In another aspect, a transmissive display device is disclosed. The display device comprises an array of interferometric modulators positioned on the back side of a substrate, and an angle converter, positioned on the front side of the substrate, for changing angular distribution of light based on the direction of light.

In another aspect, a transmissive display device is disclosed. The device comprises means for transmissively and interferometrically modulating light, the modulating means being deposited on a first side of a substrate distal from a viewer, means for enclosing the modulating means, the enclosing means being sealed to the first side of the substrate, and means for covering at least the non-active areas of the modulating means and reflecting light coming from the back of the display, the covering means being located between the enclosing means and the substrate.

In another aspect, a transmissive display device is disclosed. The device comprises means for transmissively and interferometrically modulating light, the modulating means being deposited on the back side of a substrate, and means for illuminating the modulating means with substantially collimated light.

In another aspect, a transmissive display device is disclosed. The device comprises means for transmissively and interferometrically modulating light, the modulating means being deposited on the back side of a substrate, and means for changing angular distribution of light based on the direction of light, the changing means being positioned on the front side of the substrate.

In another aspect, a transmissive display device is disclosed. The device comprises a cavity defined by a first layer deposited on a substantially transparent substrate and a second layer connected to the substrate, the first and second layers being at least partially transparent; a ring-shaped first electrode operatively connected to the first layer and a ring-shaped second electrode operatively connected to the second layer, wherein light incident to the display device is interferometrically modulated by the first and second layer.

In another aspect, a transmissive display device is disclosed. The device comprises means for interferometrically modulating light and means for actuating the interferometrically modulating means, the actuating means being ring-shaped.

In another aspect, a method of making a transmissive display device is disclosed. The method comprises forming a cavity defined by a first layer deposited on a substantially transparent substrate and a second layer connected to the substrate, the first and second layers being at least partially transparent; and forming a ring-shaped first electrode operatively connected to the first layer and a ring-shaped second electrode operatively connected to the second layer.

In another aspect, a transmissive display device is disclosed. The device comprises an array of interferometric modulators formed on a substantially transparent substrate. Each interferometric modulator comprises a cavity defined by a first layer deposited on the substrate and a second layer connected to the substrate, the first and second layers being at least partially transparent, wherein light incident to the display device is interferometrically modulated by the first and second layer; a substantially transparent first electrode operatively connected to the first layer, and a substantially transparent second electrode operatively connected to the second layer. The device further comprises a back plate coupled to the substrate and comprising at least one bus line configured to connect one or more electrodes of the interferometric modulators, the at least one bus line comprising substantially solid metal.

In another aspect, a transmissive display device is disclosed. The device comprises means for transmissively and interferometrically modulating light, the modulating means formed on a substantially transparent substrate; means for actuating the modulating means, the actuating means being substantially transparent; and means for enclosing the modulating means, the enclosing means being coupled to the substrate and further comprises means for electrically connecting at least one of the actuating means.

In another aspect, a method of making a transmissive display device is disclosed. The method comprises forming an array of interferometric modulators on a substantially transparent substrate. Each interferometric modulator comprises a cavity defined by a first layer deposited on the substrate and a second layer connected to the substrate, the first and second layers being at least partially transparent, wherein light incident to the display device is interferometrically modulated by the first and second layer; a substantially transparent first electrode operatively connected to the first layer; and a substantially transparent second electrode operatively connected to the second layer. The method further comprises forming a back plate coupled to the substrate and comprising at least one bus line configured to connect one or more electrodes of the interferometric modulators, the at least one bus line comprising substantially solid metal.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Certain embodiments as will be described below provide a transmissive backlit display. In one embodiment, the backlit display comprises a backlight and an array of transmissive interferometric modulators, wherein each interferometric modulator comprises a fixed and moving dielectric mirror stack. The interferometric modulators cause light within the desired wavelength range to be transmitted while reflecting at least a portion of the remaining light.

FIGS. 1-7E describe a display comprising an interferometric modulator. In the exemplary embodiments, reflective interferometric modulators are used for illustration. However, it should be noted that the principle described in FIGS. 1-7E may be equally applied to transmissive interferometric modulators and a display comprising transmissive interferometric modulators as will be described below with regard to FIGS. 8-13.

Figure 1:
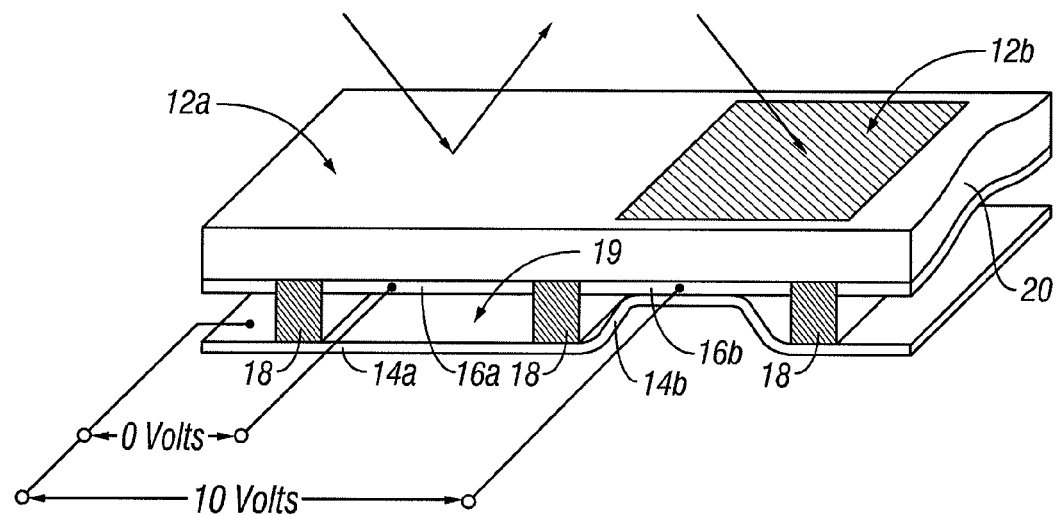
FIG. 1 is an isometric view depicting a portion of one embodiment of an interferometric modulator display in which a movable reflective layer of a first reflective interferometric modulator is in a relaxed position and a movable reflective layer of a second reflective interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application. As mentioned above, though reflective interferometric modulators are used for illustration, the principle described in FIGS. 2-5B may be equally applied to transmissive interferometric modulators as will be described below with regard to FIGS. 8-13.

Figure 2:
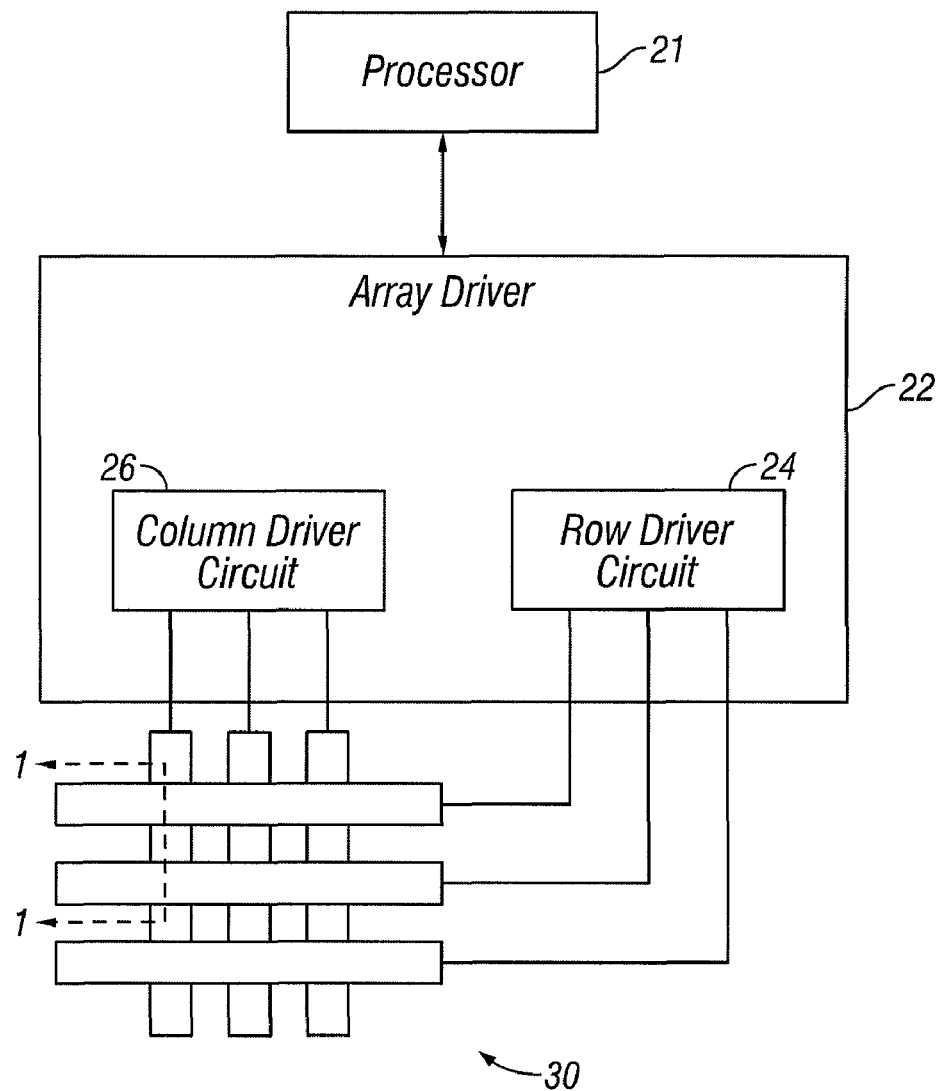
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
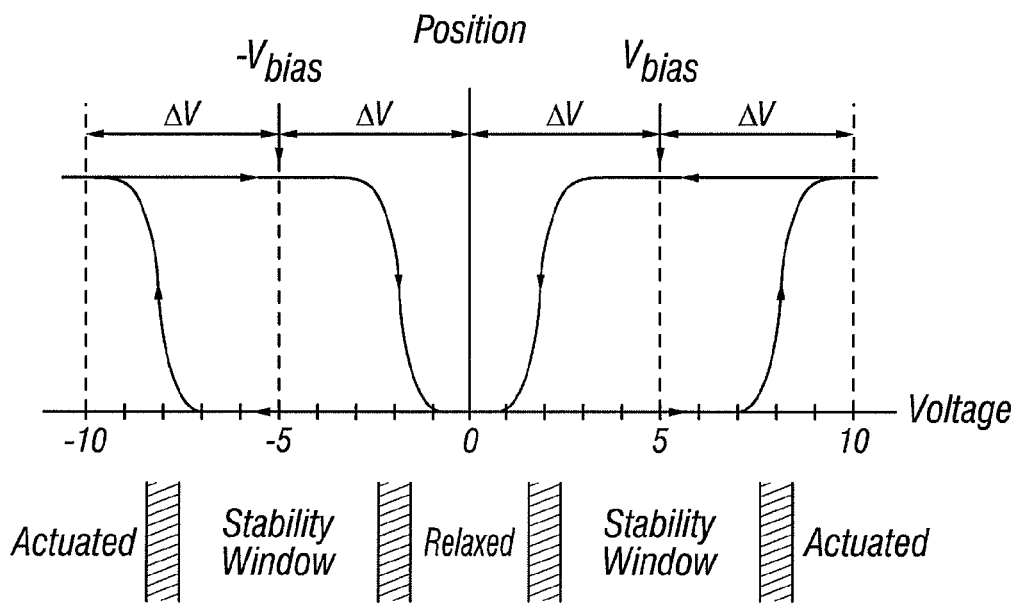
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
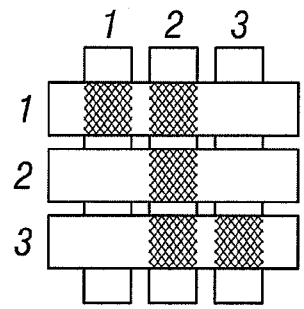
FIG. 5A illustrates one exemplary frame of display data in the 3×3 interferometric modulator display of FIG. 2.
Figure 5B:
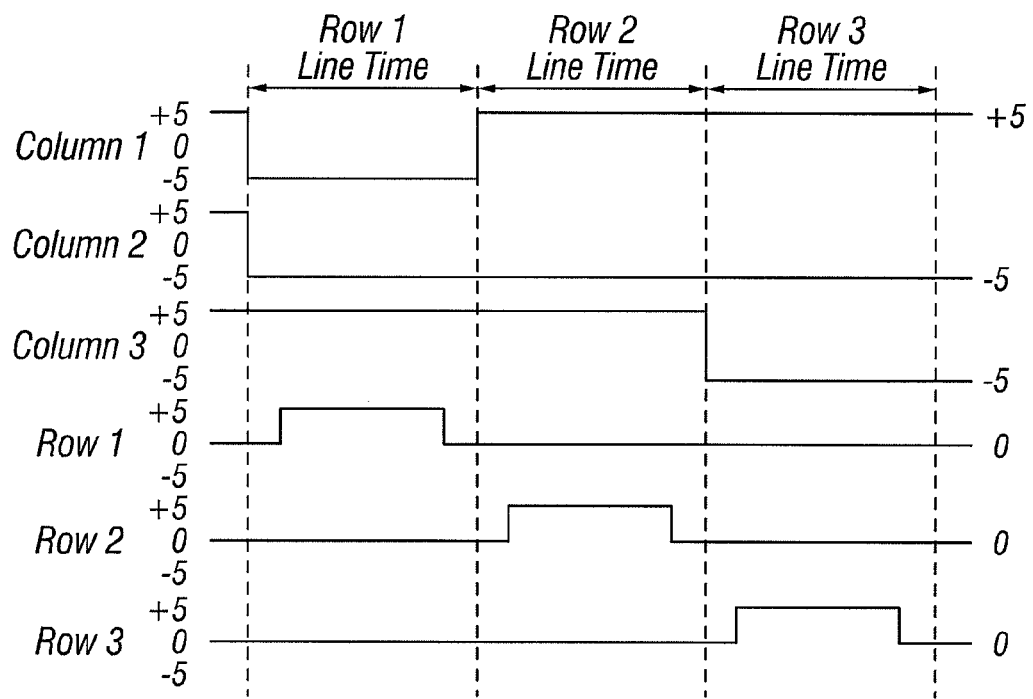
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volt, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
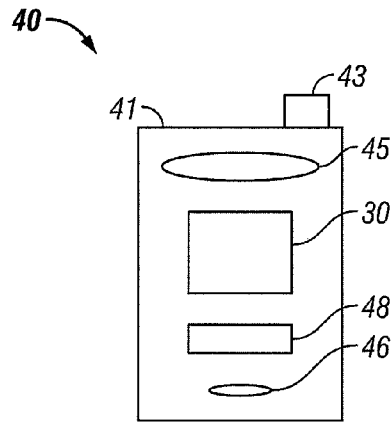
FIGS. 6A and 6B are system block diagrams illustrating an embodiment of a visual display device comprising a plurality of interferometric modulators.
Figure 6B:
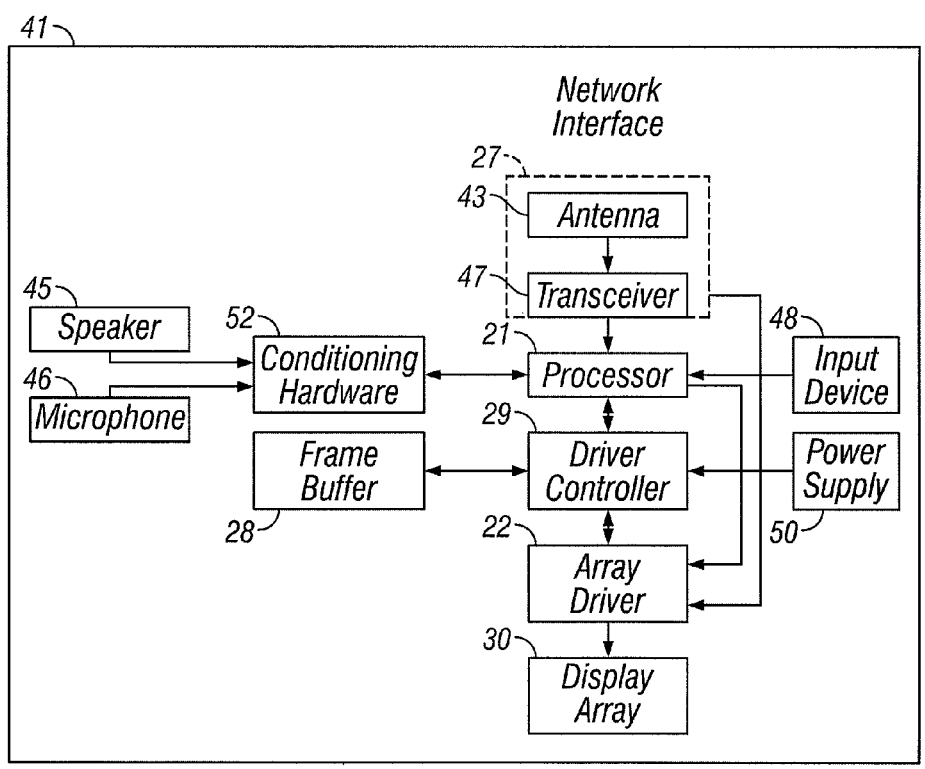

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

The details of the structure of interferometric modulators that operate in accordance with the principles set forth above may vary widely. For example, FIGS. 7A-7E illustrate five different embodiments of the movable reflective layer 14 and its supporting structures. These embodiments may be equally applied to a movable transmissive layer and its supporting structures in a transmissive interferometric modulator as will be described below with regard to FIGS. 8-13.

Figure 7A:
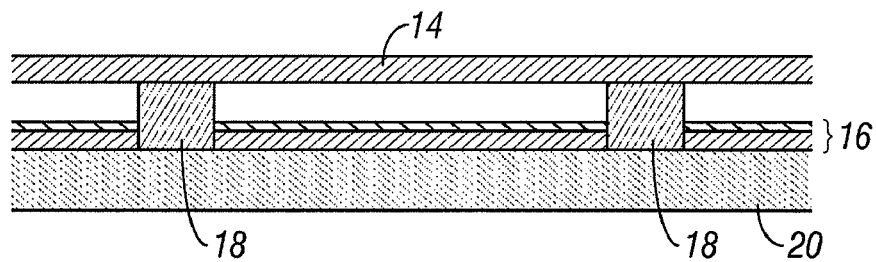
FIG. 7A is a cross section of the device of FIG. 1.
Figure 7B:
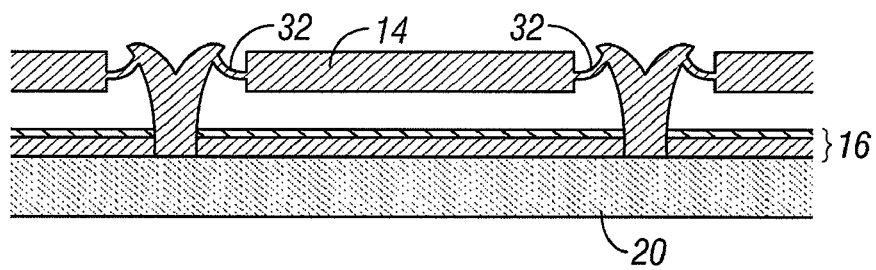
FIG. 7B is a cross section of an alternative embodiment of an interferometric modulator.
Figure 7C:
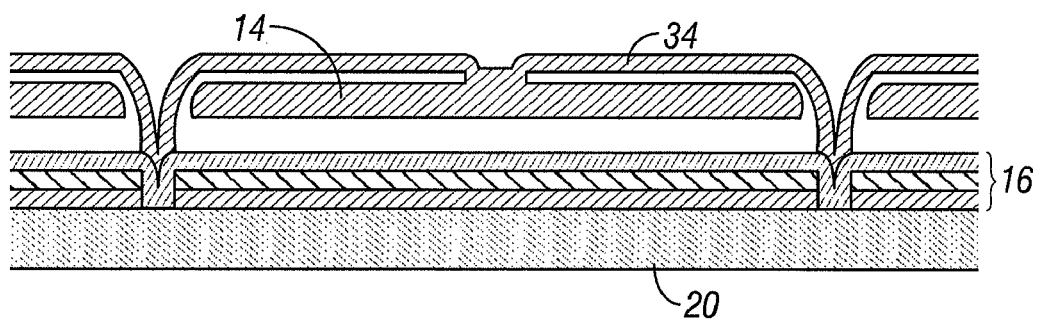
FIG. 7C is a cross section of another alternative embodiment of an interferometric modulator.
Figure 7D:
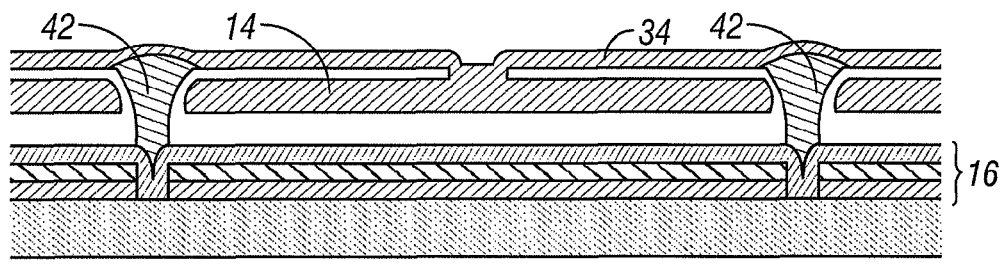
FIG. 7D is a cross section of yet another alternative embodiment of an interferometric modulator.
Figure 7E:
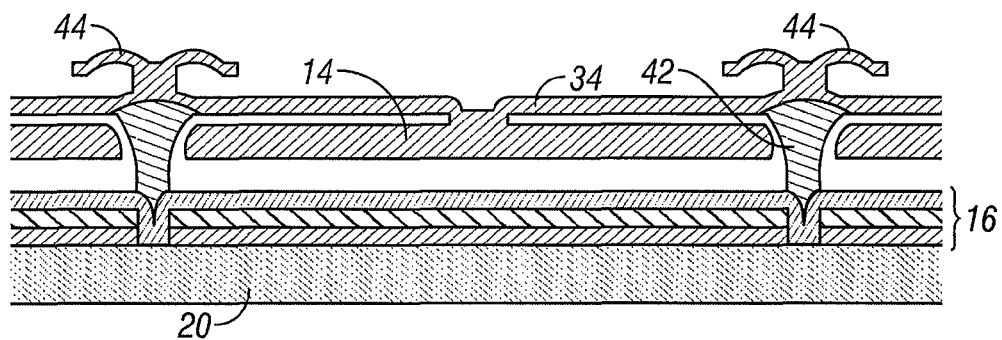
FIG. 7E is a cross section of an additional alternative embodiment of an interferometric modulator.

FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Some applications require a large display which may be viewed well in conditions of reduced ambient illumination. For such applications, reflective displays generally do not work well because reflective displays usually require frontlight and the frontlight performance of reflective displays suffers when applied to large diagonal screens. There are currently various ways to apply backlight to a reflective-type interferometric modulator display. However, these ways tend to be inefficient and diminish the perceived performance of the display.

Certain embodiments as will be described below provide a transmissive backlit display. In one embodiment, the backlit display comprises a backlight and an array of transmissive interferometric modulators, wherein each interferometric modulator comprises a fixed and moving dielectric mirror stack. The interferometric modulators cause light within the desired wavelength range to be transmitted while reflecting at least a portion of the remaining light. Each of these embodiments relating to a transmissive interferometric modulator display may be incorporated in a display application such as the application described above with regard to FIGS. 2 through 6B.

Figure 8:
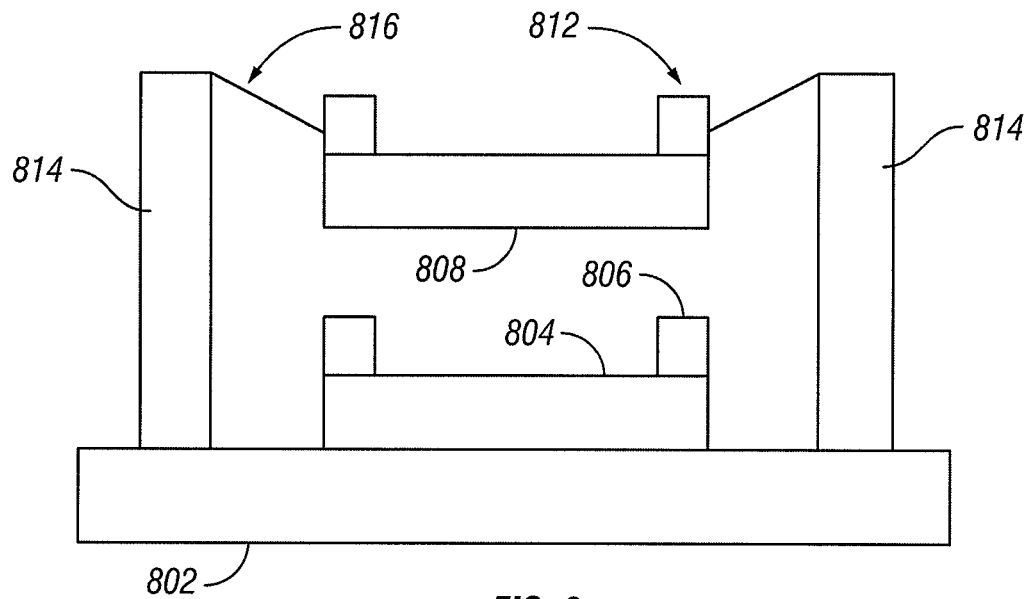
FIG. 8 is a cross section of one embodiment of a transmissive interferometric display.
Figure 9:
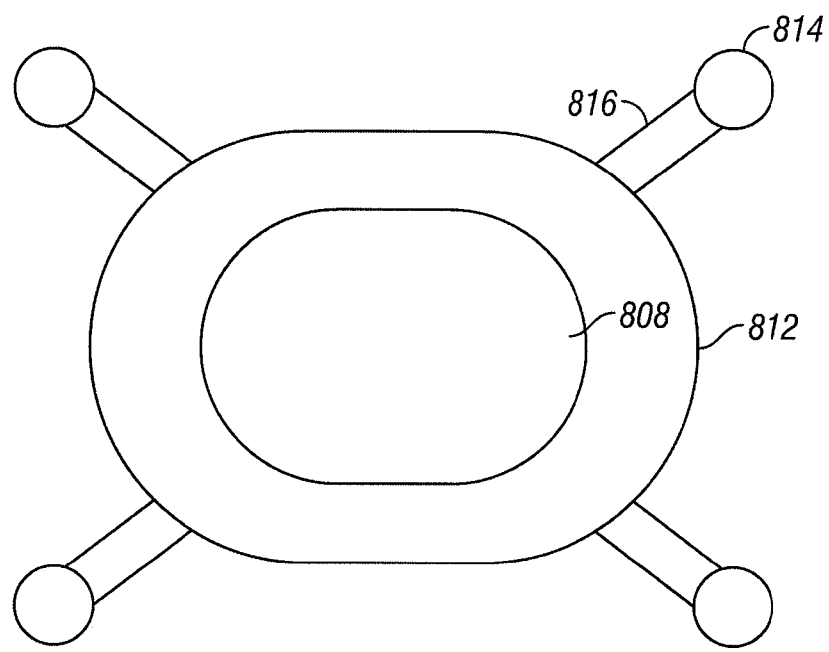
FIG. 9 is a top view of the display embodiment in FIG. 8.

One transmissive interferometric modulator display embodiment comprising an interferometric MEMS display element is illustrated in FIGS. 8 and 9. FIG. 8 is a cross section of the display embodiment, while FIG. 9 is a top view of the display embodiment.

A pixel of the display is in either a bright or dark state. A light source illuminating the display element and a user of the display element (not shown) are typically located on different sides of the display element. In the bright ("on" or "open") state, the display element transmits a large portion of incident visible light to the user. When in the dark ("off" or "closed") state, the display element transmits little incident visible light to the user. Depending on the embodiment, the light transmission properties of the "on" and "off" states may be reversed. MEMS pixels can be configured to transmit predominantly at selected colors, allowing for a color display in addition to black and white.

In some embodiments, an interferometric modulator display comprises a row/column array of these interferometric modulators. Each interferometric modulator includes a pair of transmissive layers positioned at a variable and controllable distance from each other to form a resonant optical gap with at least one variable dimension. In one embodiment, one of the transmissive layers may be moved between two positions. In the first position, referred to herein as the relaxed position, the movable transmissive layer is positioned at a relatively large distance from a fixed transmissive layer. In the second position, referred to herein as the actuated position, the movable transmissive layer is positioned more closely adjacent to the fixed transmissive layer. Incident light that transmits through the two layers interferes constructively or destructively depending on the position of the movable transmissive layer, producing either an overall transmissive or non-transmissive state for each pixel. A pixel passes through light of a particular wavelength range in an overall transmissive state, and blocks out a substantial amount of light in an overall non-transmissive state. In certain embodiments, the movable transmissive layer may move to a third position other than the relaxed position and the actuated position.

In the interferometric modulator, a movable transmissive layer 808 is illustrated in a relaxed position at a predetermined distance from a fixed transmissive layer 804. The transmissive layers 804 and 808, as referenced herein, may be formed from a variety of materials that are partially transparent such as various dielectrics. In one embodiment, the transmissive layers 804 and 808 are formed from a transparent dielectric.

The transmissive layers 804 and 808 are operatively connected to ring-shaped electrodes 806 and 812 respectively. The electrodes 806 and 812 may comprise electrically conductive material, e.g., metal or metal oxide. The electrodes 806 and 812 are typically shaped similarly and aligned with each other such that the electrodes attract each other under electrostatic forces.

In one embodiment, the electrodes 806 and 812 comprise absorbing metal or metal oxide. The electrodes 806 and 812 are ring-shaped such that light transmitted through the transmissive layers 804 and 812 can pass through the center hole surrounded by the electrodes as shown in FIG. 9. The center hole defines the active area of the exemplary interferometric modulator, which is the area of an interferometric modulator where incident light is interferometrically modulated by the movable and fixed transmissive layers. The rest of the area of the interferometric modulator display is referred to as a non-active area. It should be noted that shapes other than ring may also be used for electrodes 806 and 812.

The transmissive layers 804 and 808 and the electrodes 806 and 812 may be fabricated, for example, by depositing one or more of the above layers onto a transparent substrate 802. Each layer can be formed of one or more layers of materials, and can be formed of a single material or a combination of materials.

The movable electrode 812 may be connected to a supporting structure in various ways as illustrated in FIGS. 7A-7E. For example, corners of the electrode 812 may be attached to supports 814 on tethers 816 as shown in FIG. 9.

With no applied voltage differential across the electrodes 806 and 812, a gap remains between the movable transmissive layer 808 and fixed transmissive layer 804, with the tether 816 in a mechanically relaxed state, as illustrated in FIG. 9. However, when a potential difference is applied across the electrodes 806 an 812, the capacitor becomes charged, and electrostatic forces pull the electrodes together. If the voltage is high enough, the tether 816 is deformed and the moveable electrode 812 is forced against the fixed electrode 806. The movable transmissive layer 808 which moves along with the electrode 812 is thus forced against the fixed transmissive layer 804. The behavior is the same regardless of the polarity of the applied potential difference. Therefore, the combination of two partially transmissive layers separated by an air gap may be used to pass light within a wavelength range while reflecting light outside the range.

Figure 10:
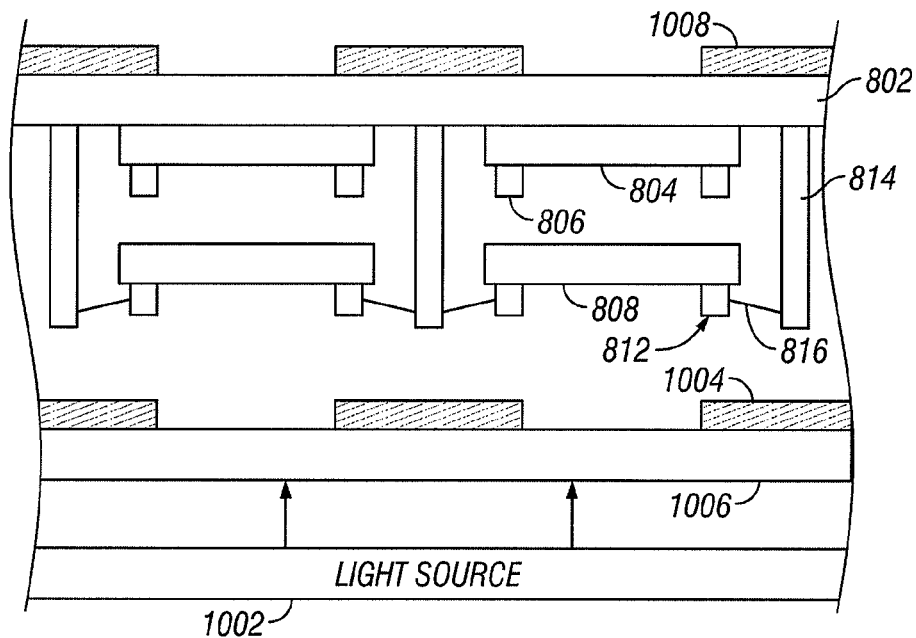
FIG. 10 illustrates another embodiment of a transmissive interferometric modulator display comprising black masks on the front and/or back of the display covering non-active areas.

FIG. 10 illustrates another embodiment of a transmissive interferometric modulator display. The embodiment includes at least one black mask on the back and/or front of the display covering the non-active areas of an array of interferometric modulators, thereby offering an improved performance.

In the exemplary embodiment, the display comprises an array of interferometric modulators deposited on the back side of a substantially transparent substrate 802. Each interferometric modulator may be the same as described with regard to FIGS. 8 and 9.

In one embodiment, a light source 1002 is located behind the back side of a back plate 1006 to illuminate through the array of interferometric modulators. The light source 1002 may be, for example, a substantially collimated light source.

In one embodiment, a reflective black mask 1004 is located somewhere between the front side of the back plate 1006 and the substrate 802. The reflective black mask 1004 is patterned to cover the non-active areas of the array of interferometric modulators. The reflective black mask 1004 could be deposited on the front side of the back plate 1006. The reflective black mask 1004 keeps light, entering the back of the display, from reaching non-active areas of the pixel.

In one embodiment, the display is configured to recycle the backlight. Either light incident on non-active areas of the pixel from the back of the display which is reflected by the reflective black mask 1004, or light incident on active areas of the pixel from the back of the display which gets reflected by the two transmissive layers 804 and 808, may be reflected by, e.g., a reflective layer (not shown) behind the light source 1002, and enter the array of interferometric modulators for a second time. Eventually, the light has a chance of hitting a proper active area.

In one embodiment, the display further comprises an absorbing black mask 1008 deposited on the front side of the substrate 802. The absorbing black mask 1008 is also patterned to cover the non-active areas of the array of interferometric modulators. The absorbing black mask 1008 keeps light coming from the front side of the substrate from entering the non-active regions. The absorbing black mask 1008 further keeps light that has entered the non-active regions from exiting to the front side of the substrate 802. This reduces light reflecting off the front side of the substrate 802, thereby improving the contrast ratio of the display.

Figure 11:
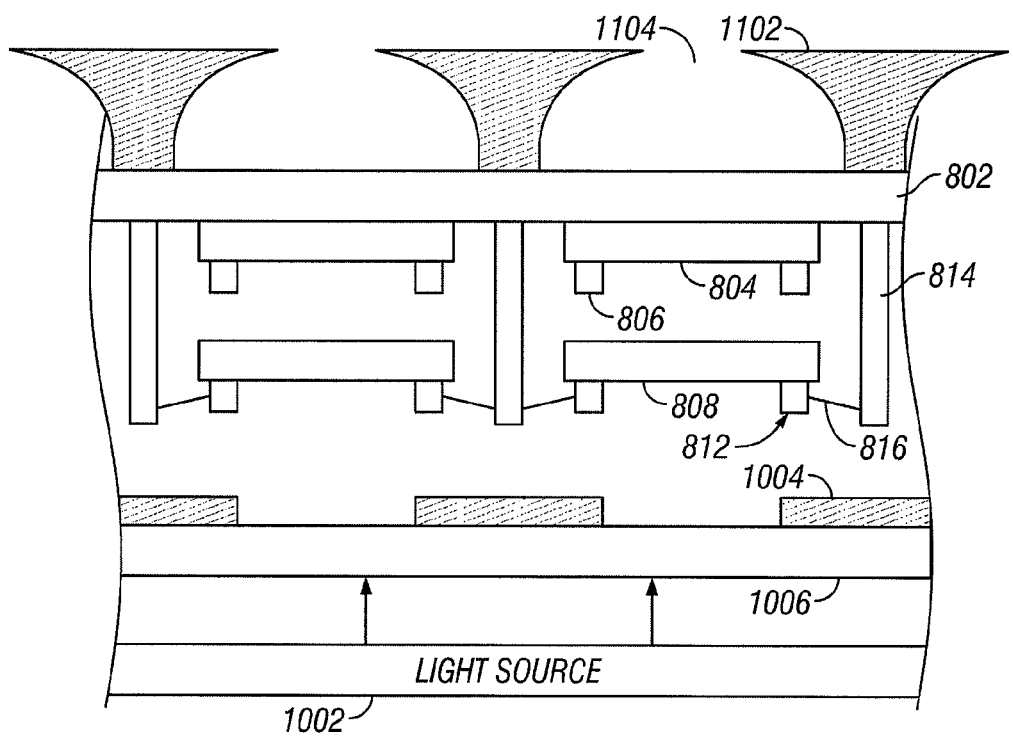
FIG. 11 illustrates another embodiment of a transmissive interferometric modulator display comprising an angle converter on the front of the display.

FIG. 11 illustrates another embodiment of a transmissive interferometric modulator display. As shown, the display may comprise an angle converter 1102 as shown in FIG. 11 on the front side of the array of interferometric modulators, instead of an absorbing black mask 1008 in FIG. 10.

The angle converter 1102 is configured to change angular distribution of incident light based on the direction of light. The angle converter 1102 reduces reflection of light coming from the front side of the substrate. The angle converter 1102 also broadens angular distribution of light passing through the array of interferometric modulators. The collimated light coming from the back light is changed to wide-angle light that can be easily seen throughout a wide viewing area in front of the display.

In the exemplary embodiment, the angle converter 1102 includes an angle filter, which comprises a set of black masks separated by small gaps 1104 as shown in FIG. 11. There is one black mask on each side of the pixel. The black masks have a substantially flat front side and a concave back side. The two black masks closest to a pixel therefore form an approximately semi-parabolic cavity over a pixel. The cavity may be of any suitable shape which causes light coming from the back side of the angle filter to be redirected. The front and back surfaces of the angle filter are made from different material. In one embodiment, the cavity of the angle filter may be filled with air or a solid transparent material.

With this structure, the front surface of the angle filter functions as an absorbing black mask. The absorbing black mask keeps light coming from the front side of the substrate 802 from entering the pixel. The absorbing black mask further keeps light that has entered the non-active regions from exiting to the front side of the substrate 802. This reduces light reflecting off the front side of the substrate 802, and thereby improving the contrast ratio of the display.

The back surface of the angle filter diffuses collimated light transmitted by the array of interferometric modulators to a user at the front side of the display. When a pixel is in a transmissive state, the pixel interferometrically modulates light coming from the light source 1002 and allows at least a portion of the incident light to pass through. The light passing though the pixel then gets diffused when passing through the approximately semispherical cavity, before reaching users located at the front side of the display. This improves the viewing experience of users.

Figure 12:
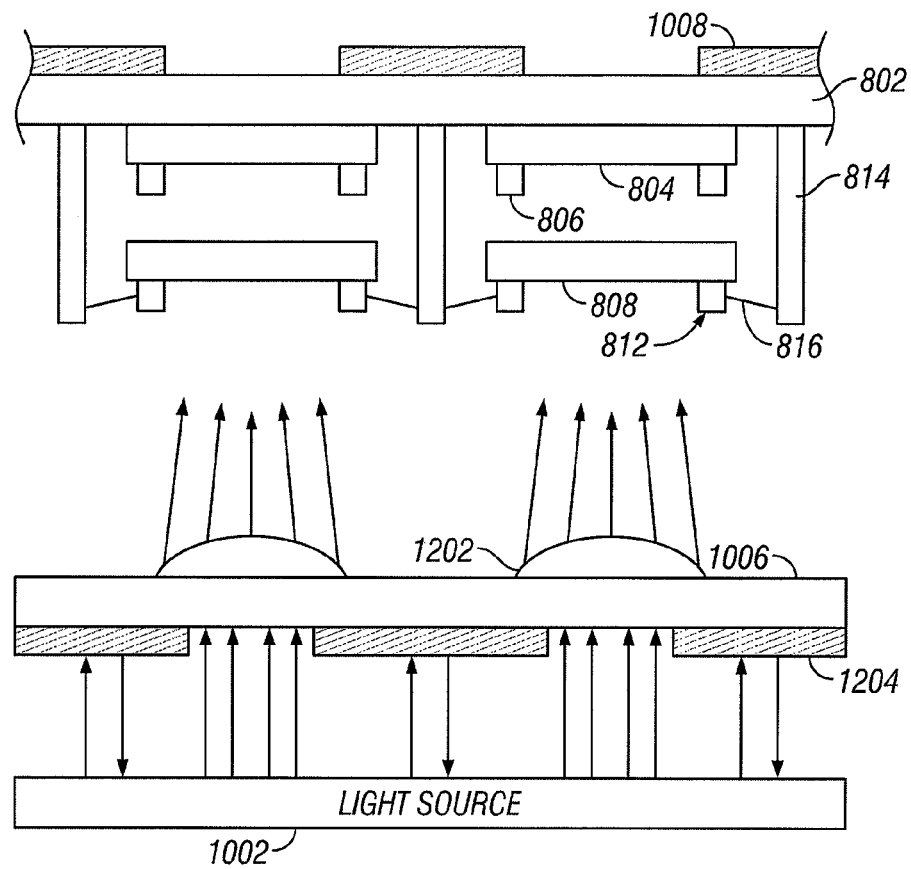
FIG. 12 illustrates another embodiment of a transmissive interferometric modulator display comprising a lenslet array converging backlight into the pixels.

FIG. 12 illustrates another embodiment of a transmissive interferometric modulator display. The embodiment includes a lenslet array 1202 between the light source 1002 and the array of the interferometric modulators, due to the "bullseye" nature of the pixels. Each lenslet 1202 converges incident light from the light source 1002 into active areas of the interferometric modulator. The lenslet array 1202 may be deposited on the back side of a substantially transparent back plate 1006.

In one embodiment, a reflective film 1204 is located between the lenslet 1202 and the light source 1002 to cover areas between the lenslets 1202. The reflective film 1204 is used, for example, to ensure that light enters the lenslets 1202 at a desired angle. Light reaching the areas between the lenslets 1202 is reflected and may further be recycled.

Figure 13:
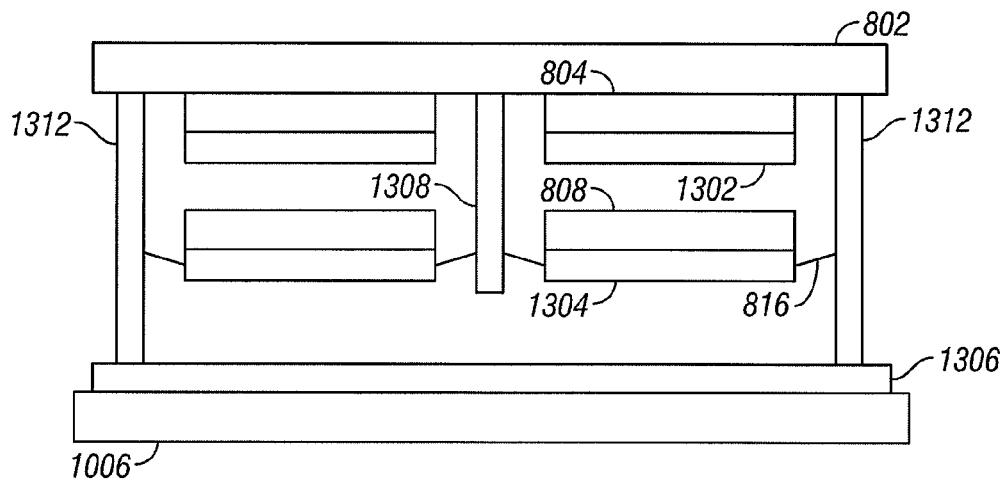
FIG. 13 illustrates another embodiment of a transmissive interferometric modulator display.

FIG. 13 illustrates another embodiment of a transmissive interferometric modulator display embodiment comprising an array of interferometric MEMS display elements. The transmissive interferometric modulator operates on the same principle as described with regard to FIGS. 8 and 9, but with a different structure.

In the interferometric modulator, a movable transmissive layer 808 is illustrated in a relaxed position at a predetermined distance from a fixed transmissive layer 804. The transmissive layers 804 and 808, as referenced herein, may be formed from a variety of materials that are partially transparent such as various dielectrics. In one embodiment, the transmissive layers 804 and 808 are formed from a transparent dielectric.

The transmissive layers 804 and 808 are operatively connected to electrodes 1302 and 1304 respectively. The electrodes 1302 and 1304 comprise electrically conductive material, e.g., metal or metal oxide. The electrodes 1302 and 1304 comprise substantially transparent metal or metal oxide, e.g., zinc oxide or ITO. The electrodes 1302 and 1304 are typically shaped similarly and aligned with each other such that the electrodes attract each other under electrostatic forces.

The transmissive layers 804 and 808 and the electrodes 1302 and 1304 may be fabricated, for example, by depositing one or more of the above layers onto a transparent substrate 802. Each layer can be formed of one or more layers of materials, and can be formed of a single material or a combination of materials.

The movable electrode 1304 may be connected to a supporting structure in various ways as illustrated in FIGS. 7A-7E. For example, the movable electrode 1304 may be attached to supports 1308 and 1312 on tethers 816 as shown in FIG. 13.

In one embodiment, the display further comprises a back plate 1006 which is to be coupled to the substrate 802 upon assembly. In the exemplary embodiment, the back plate 1006 further comprises at least one bus line 1306. The bus line 1306 is configured to connect selected electrodes of the interferometric modulators and provides a high conductivity rating. The bus line 1306 may be formed by using a substantially solid metal. The back plate 1006 may be placed directly on the highest layer of posts 1312 on the substrate 802 used to support the bus line 1306.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A transmissive display device, comprising:
   an array of interferometric modulators formed on a substantially transparent substrate, each interferometric modulator comprises:
     a cavity defined by a first layer deposited on the substrate and a second layer connected to the substrate, the first and second layers being at least partially transparent, wherein light incident to the display device is interferometrically modulated by the first and second layers,
     a substantially transparent first electrode operatively connected to the first layer,
     a substantially transparent second electrode operatively connected to the second layer;
   and
   a back plate coupled to the substrate and comprising at least one bus line configured to connect one or more electrodes of the interferometric modulators, the at least one bus line comprising substantially solid metal.

2. The device of claim 1, wherein each of the first and second layers comprises dielectric material.

3. The device of claim 1, wherein each of the first and second electrodes comprises metal or metal oxide.

4. The device of claim 1, wherein each of the first and second electrodes comprises zinc oxide or ITO.

5. The device of claim 1, wherein the second layer is movable between a first and a second position.

6. The device of claim 5, wherein each interferometric modulator is configured to block out a substantial amount of visible light while the second layer is in a second position.

7. The device of claim 5, wherein each interferometric modulator is configured to pass through light of a particular wavelength range while the second layer is in a first position.

8. The device of claim 5, wherein the second layer is further movable to a third position.

9. The device of claim 1, further comprising:
   a display;
   a processor that is configured to communicate with said display, said processor being configured to process image data; and
   a memory device that is configured to communicate with said processor.

10. The device of claim 9, further comprising a driver circuit configured to send at least one signal to the display.

11. The device of claim 10, further comprising a controller configured to send at least a portion of the image data to the driver circuit.

12. The device of claim 9, further comprising an image source module configured to send said image data to said processor.

13. The device of claim 12, wherein the image source module comprises at least one of a receiver, transceiver, and transmitter.

14. The device of claim 9, further comprising an input device configured to receive input data and to communicate said input data to said processor.

15. A transmissive display device, comprising:
   means for transmissively and interferometrically modulating light, the light modulating means formed on a substantially transparent substrate;
   means for actuating the light modulating means, the actuating means being substantially transparent;
   and
   means for enclosing the light modulating means, the enclosing means being coupled to the substrate and comprising means for electrically connecting at least one of the actuating means.

16. The device of claim 15, wherein the light modulating means and the actuating means are formed as an array of interferometric modulators formed on the substantially transparent substrate, each interferometric modulator comprises:
   a cavity defined by a first layer deposited on the substrate and a second layer connected to the substrate, the first and second layers being at least partially transparent, wherein light incident to the display device is interferometrically modulated by the first and second layers,
   a substantially transparent first electrode operatively connected to the first layer, and
   a substantially transparent second electrode operatively connected to the second layer,
   and wherein the light modulating means comprise the first and second layers of the interferometric modulators and the actuating means comprises the first and second electrodes of the interferometric modulators.

17. The device of claim 16, wherein the enclosing means comprises a back plate coupled to the substrate and comprising at least one bus line configured to connect one or more electrodes of the interferometric modulators, the at least one bus line comprising substantially solid metal.

18. A method of making a transmissive display device, comprising:
   forming an array of interferometric modulators on a substantially transparent substrate, each interferometric modulator comprises:
     a cavity defined by a first layer deposited on the substrate and a second layer connected to the substrate, the first and second layers being at least partially transparent, wherein light incident to the display device is interferometrically modulated by the first and second layers,
     a substantially transparent first electrode operatively connected to the first layer,
     a substantially transparent second electrode operatively connected to the second layer;
   and
   forming a back plate coupled to the substrate and comprising at least one bus line configured to connect one or more electrodes of the interferometric modulators, the at least one bus line comprising substantially solid metal.

19. The method of claim 18, wherein each of the first and second layers comprises dielectric material.

20. The method of claim 18, wherein each of the first and second electrodes comprises metal or metal oxide.

21. The method of claim 18, wherein each of the first and second electrodes comprises zinc oxide or ITO.

22. The method of claim 18, wherein each of the first and second electrodes comprises absorbing metal or absorbing metal oxide.

23. The method of claim 18, wherein the second layer is movable between a first and a second position.

24. The method of claim 23, wherein the display device blocks out a substantial amount of visible light while the second layer is in the second position.

25. The method of claim 23, wherein the display device passes through light of a particular wavelength range while the second layer is in the first position.

26. The method of claim 23, wherein the second layer is further movable to a third position.

* * * * *